Figure 1:
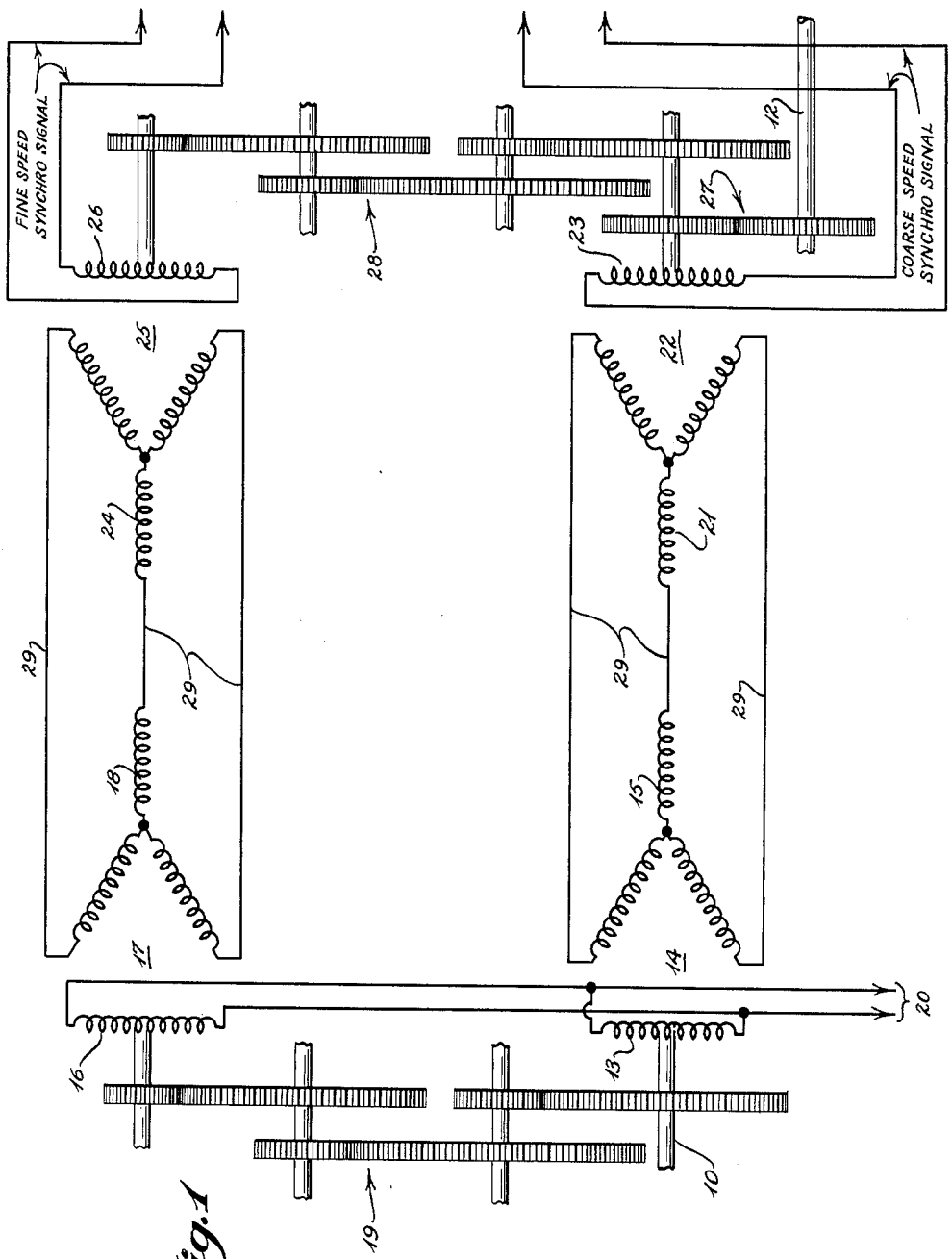

Feb. 21, 1956 R. S. RAVEN ET AL 2,735,971
TWO SPEED CONTROL CIRCUIT
Filed July 24, 1953 2 Sheets-Sheet 1

INVENTORS
Robert S. Raven
Harry C. Moses
BY
Walter S. Paul
ATTORNEYS

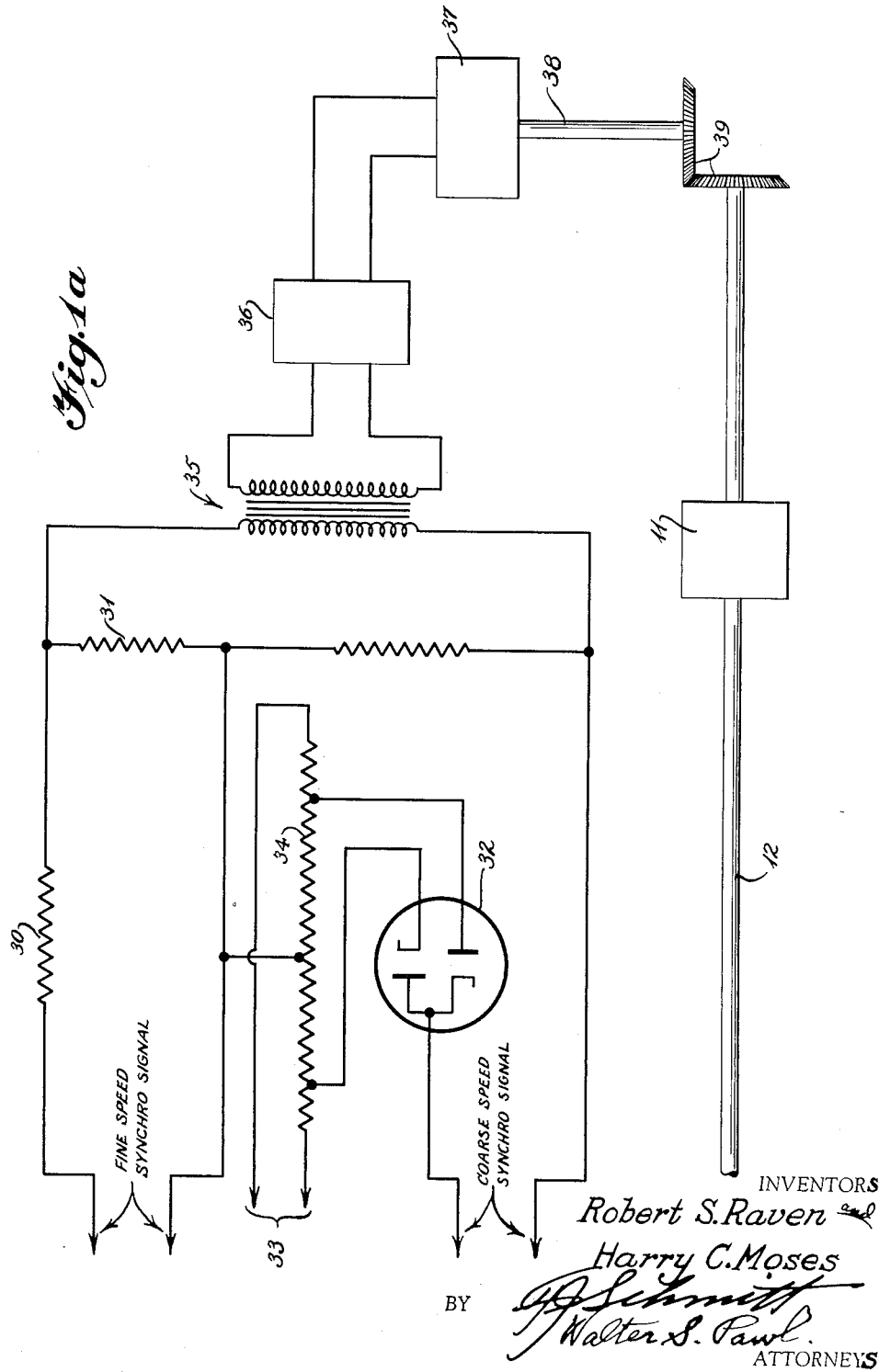

United States Patent Office 2,735,971
Patented Feb. 21, 1956

2,735,971

TWO SPEED CONTROL CIRCUIT

Robert S. Raven, Catonsville, and Harry C. Moses, Baltimore, Md., assignors, by mesne assignments, to the United States of America as represented by the Secretary of the Navy Application July 24, 1953, Serial No. 370,024

1 Claim. (Cl. 318—30)

This invention relates to a novel system of operating on coarse and fine speed synchro voltages used in the control of a high accuracy position servo. A synchro is a small rotating transformer which produces an A. C. voltage in or out of phase with the line voltage depending upon whether the rotor is on one side or the other of a zero position. The amplitude of this voltage varies directly within limits, with the number of degrees that the rotor is off this zero position. The position of the zero can be varied by means of a second synchro connected electrically to the first. In a servomechanism, the first synchro is connected to the output shaft of the second synchro representing the input. This voltage can be used to drive the output shaft so that it follows the input.

The best synchros cannot be built with an error of less than about one-half degree because of hysteresis, winding inaccuracies, backlash, etc. In many high quality servos, however, much greater accuracy than this is desired. The way to get this better accuracy is to gear down the synchro on the output shaft so that a movement of one degree of this shaft causes the synchro to move $n$ degrees. Thus a gain in accuracy of $1/n$ has been made. The difficulty with this is that the synchro now possesses multiple zero positions or lock-in points. That is, the geared down synchro cannot distinguish between when it is on the true zero or when it is a multiple of 360 degrees away from this zero. The way to get around this trouble is to mount a coarse or unity speed synchro directly on the output shaft and use it to override the fine speed or geared down synchro when this synchro is on one of the false zeros. The subject of this disclosure is a means of modifying the voltages from these two synchros and adding them together to give a single unambiguous control voltage which can be amplified and used to drive a motor controlling the output shaft.

The manner in which this is done is to put a pair of biased diodes in series with the coarse speed signal so that no voltage from this synchro is transmitted when the output shaft is closer than ±1 degree to the true zero position. Inside this limit the control signal is supplied completely by the fine speed synchro and the system is very accurate. It is essential that the erroneous signals from the coarse speed synchro be kept out of the control signal within these limits about zero. When the output shaft is more than ±1 degree off the zero position, the diodes allow a signal to be transmitted from the coarse speed synchro. This signal is added to the signal from the fine speed synchro and the sum is the desired control signal. The coarse speed signal increases much faster than the fine speed signal because this signal is sharply attenuated. The result is that the coarse speed voltage soon overrides the fine speed voltage and an unambiguous control signal is the result.

Accordingly, it is an object of this invention to provide a sensitive remote positional control system in which the synchro transmission error is reduced to a minimum.

Another object of the invention is to provide in a remote positional control system employing both a high and low speed synchro transmission channel, simple and reliable means for substantially eliminating the error which otherwise would be contributed by the low speed channel.

A further object of the invention is to provide novel means in a remote positional control system wherein a follow-up servo system is under the control of a coarse and a fine synchronous receiver, for rendering ineffectual the control of the coarse receiver during such times as the system is substantially in synchronism.

Other objects and advantages will become apparent from the specification taken in connection with the accompanying drawing wherein one embodiment of the invention is illustrated.

In the drawing, the sole figure illustrates a schematic representation of a preferred embodiment of the invention.

The numeral 10 designates the input shaft whose angular position is to be followed by the load 11 on output shaft 12. Shaft 10 is directly coupled to rotor 13 of the coarse speed synchronous transmitter 14. Shaft 10 is also coupled to rotor 16 of the fine speed synchronous transmitter 17 via reduction gearing 19 having a reduction ratio of $n$. As a result, rotor 13 has the same angular velocity as the input shaft 10 while rotor 16 has a higher angular velocity, the ratio being determined by the gearing 19. The rotors 13 and 16 are connected to a suitable source of alternating current via single phase leads 20. Stators 15 and 18 of synchronous transmitters 14 and 17 respectively are connected to comparable points on the stators 21 and 24 of synchronous receivers 22 and 25 respectively via leads 29. Rotor 23 of synchronous receiver 22 is coupled to the output shaft 12 via gears 27 which are in a 1:1 ratio. The output shaft 12 is also coupled to rotor 26 of synchronous receiver 25 via gears 27 and gearing 28, the latter gearing having a gear ratio identical to that of gearing 19.

Rotors 13 and 16 produce in their respective stators 15 and 18 alternating magnetic fields having positions in space corresponding to the positions in space of the rotors 13 and 16. As the rotors are mechanically coupled to the input shaft 10, any rotation of the shaft will cause a predetermined rotation of the rotors and a corresponding shift of the alternating magnetic fields in the stators 15 and 18 of the synchronous transmitters 14 and 17. As the stators 21 and 24 of the synchronous receivers 22 and 25 are connected to corresponding points on stators 15 and 18, stators 21 and 24 will reproduce the magnetic fields present in stators 15 and 18. Since rotors 23 and 26 of synchronous receivers 22 and 25 are mechanically coupled to output shaft 12, voltages will be induced in these rotors the values of which are proportional to the angular displacement between shafts 10 and 12. As the fine speed synchronous unit 17—25 rotates $n$ times as fast as the coarse speed synchronous unit 14—22, for a small displacement the voltage induced in rotor 26 will be approximately $n$ times as large as that induced in rotor 23. To reduce the voltage of rotor 26 to the same level as the coarse speed signal transmitted by rotor 23, it is attenuated. This is the function of resistors 30 and 31 in the fine speed circuit of rotor 26. The coarse speed signal from rotor 23 is applied to double diode 32, the bias for which is supplied by leads 33 across resistor 34. The two voltages or signals are summed by the transformer 35 to give the output control signal. The bias on tube 32 is such that no signal is transmitted to transformer 35 from the coarse speed rotor 23 when output shaft 12 is closer than ±1 degree to the true zero position. Inside this limit the control signal is supplied completely by the fine speed rotor 26 and the system is very accurate. When the output shaft is more than ±1 degree off the true zero position, diode 32 permits a signal to be transmitted from the coarse speed rotor 23. This signal is added to the signal from the fine speed rotor 26 and the sum of the two is the desired control signal. The coarse speed signal increases much faster than the fine speed signal because the latter is sharply attenuated. The result is that the coarse speed voltage soon overrides the fine speed voltage and an unambiguous control signal is the result.

The summation voltage output of transformer 35 is applied to amplifier 36 wherein it is amplified and then applied to servomotor 37 which may be of conventional design. The input to the servomotor produces a rotation therein in accordance with the voltage applied to it. This rotation is transmitted to output shaft 12 via shaft 38 and bevel gears 39. As a result, load 11 will follow the displacement of input shaft 10. As the output shaft 12 is mechanically coupled to rotors 23 and 26 of the synchronous receivers 22 and 25, these rotors will also follow the displacement of shaft 10 and will effectively lock on the signals from the synchronous transmitters 14 and 17.

Having thus disclosed an exemplary embodiment thereof, what we claim as our invention is:

In a servo system, fine and coarse transmission systems, a servomotor connected for control by a combined voltage output of said fine and coarse systems, and a circuit for combining the individual outputs of said fine and coarse systems to produce the said combined voltage output comprising impedance means for attenuating the output of said fine system, two diodes inversely connected to the output of said coarse system, adjustable bias voltage means for said diodes whereby no current is passed in the coarse system output unless the magnitude of the voltage output of said coarse system exceeds the biasing voltages, an impedance connected in the output of said coarse system, series means for connecting the coarse system impedance and a portion of the fine system impedance means in series, a transformer connected in parallel with said series means, and electrical connections between said transformer and said servomotor.

References Cited in the file of this patent

UNITED STATES PATENTS

| | | |
|---|---|---|
| 2,561,654 | Eller | July 24, 1951 |
| 2,614,237 | Goertz | Oct. 14, 1952 |
| 2,670,456 | Naylor et al. | Feb. 23, 1954 |